Inventor
Paul M. Fischer
By H R Rather
Attorney

Inventor
Paul M. Fischer
By H R Rather
Attorney

United States Patent Office 2,989,676
Patented June 20, 1961

2,989,676
PLURAL-PHASE RECTIFIER NETWORK FOR AN INDUCTIVE LOAD AND PROTECTIVE MEANS THEREFOR
Paul M. Fischer, Elm Grove, Wis., assignor to Cutler-Hammer, Inc., Milwaukee, Wis., a corporation of Delaware
Filed Apr. 3, 1958, Ser. No. 726,160
2 Claims. (Cl. 318—345)

This invention relates to motor control systems and more particularly to fault prevention circuits for rectifier networks employed for transferring energy between an alternating current supply source and a direct current motor or the like.

While not limited thereto, the invention is especially applicable to rectifier systems for supplying and controlling power from a plural-phase alternating current supply source to the armature winding of a direct current motor.

Paul M. Fischer copending application Serial No. 685,599, filed September 23, 1957, now Patent No. 2,929,979, granted March 22, 1960, and assigned to the assignee of the present invention, discloses rectifier systems of the aforementioned type. The present invention comprises improvements therefor.

A general object of the invention is to provide improved means for supplying and selectively controlling power from a plural-phase alternating current power supply source to an inductive direct current load.

A more specific object of the invention is to provide improved means for controlling operation of a plurality of unidirectional current conducting devices connected in a rectifier network between a plural-phase source and an inductive direct current load.

A still more specific object of the invention is to provide such network connected between a plural-phase source and a direct current motor with improved means for restricting conduction of the unidirectional current conducting devices to a predetermined repetitively sequential order.

Another specific object of the invention is to provide an electron discharge device rectifier network connected between a three-phase source and a direct current motor with improved protective means operative to prevent misfiring of the discharge devices.

Other objects and advantages of the invention will hereinafter appear.

While the apparatus hereinafter described is effectively adapted to fulfill the objects stated, it is to be understood that I do not intend to confine my invention to the particular preferred embodiments of protective systems disclosed, inasmuch as they are susceptible of various modifications without departing from the scope of the appended claims.

A system and modifications thereof in accordance with the invention will now be described in detail with reference to the accompanying drawings, wherein:

FIGURE 1 diagrammatically shows a motor control system provided with a protective network constructed in accordance with the invention;

Figure 1:
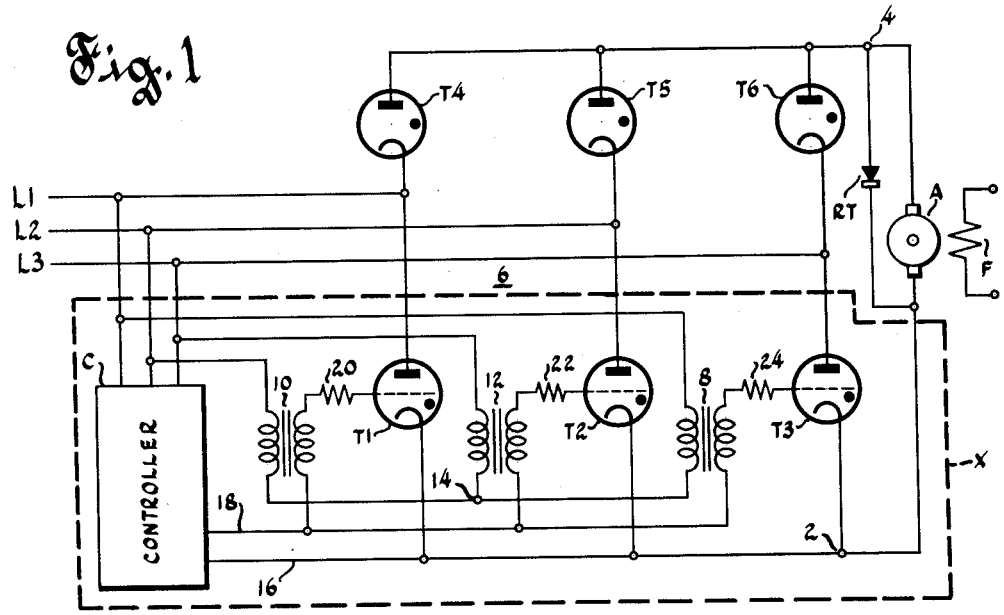
Figure 2:
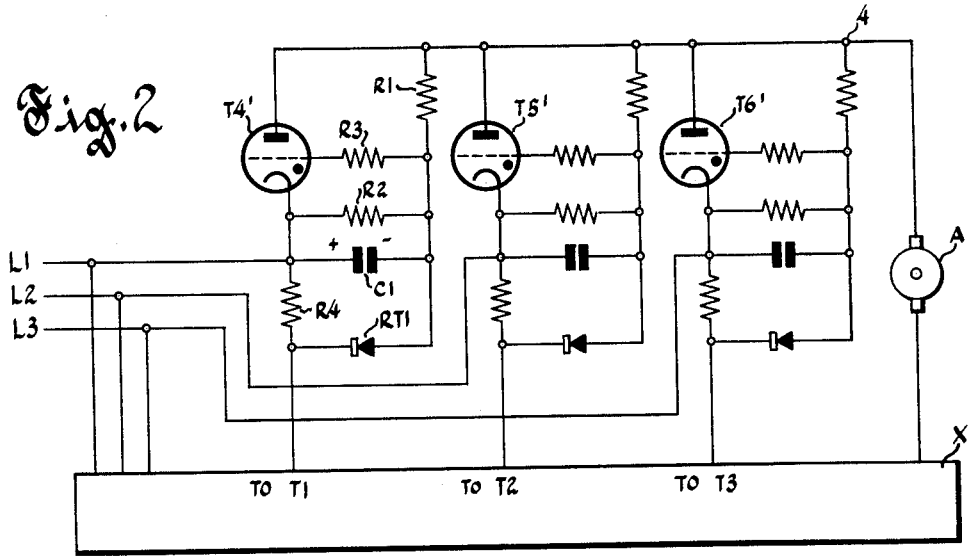
FIG. 2 shows partly diagrammatically and partly schematically a motor control system provided with a modified protective network.
Figure 3:
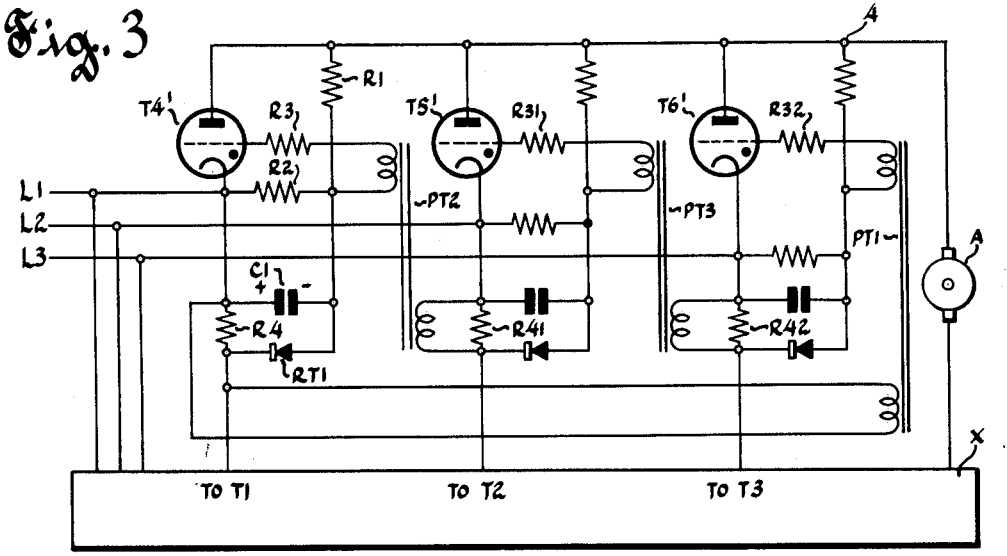
FIGS. 3 and 4 show further modifications of the protective network applied to a motor control system similar to that of FIG. 2.
Figure 4:
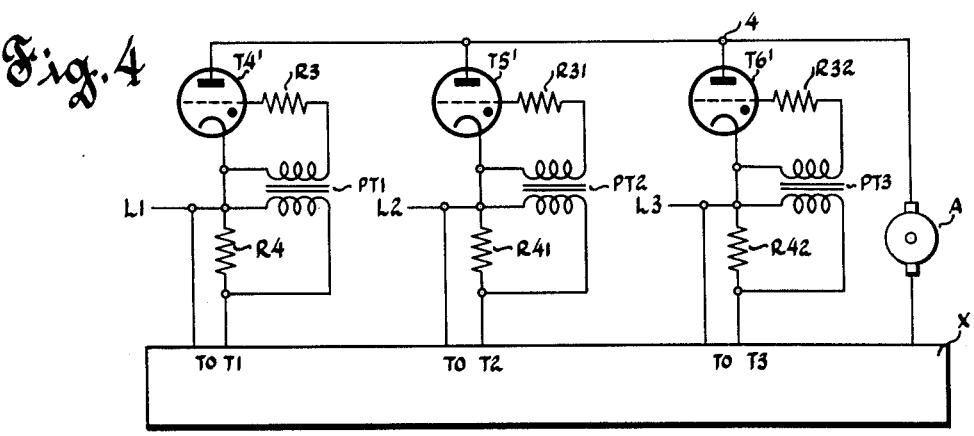

The portion of the diagram in each of FIGS. 2, 3 and 4 represented by a rectangle X is identical to the lower portion X enclosed within the broken lines in FIG. 1 and, therefore, has been shown schematically to avoid complicating the drawings.

Referring to FIG. 1, there is shown a direct current motor having an armature winding A and a field winding F, the latter being connectable at its terminals to a suitable direct current power supply source in the usual manner. Armature A is connected for energization across output terminals 2 and 4 of a three-phase full-wave rectifier network indicated generally by 6, the latter having its input terminals connected through lines L1, L2 and L3 to a three-phase alternating current power supply source. Rectifier network 6 is provided with three controlled rectifiers T1, T2 and T3 shown as gas filled triodes and three uncontrolled rectifiers T4, T5 and T6 shown as gas filled diodes. Lines L1, L2 and L3 are connected to the anodes of controlled rectifiers T1, T2 and T3, respectively, the cathodes of the latter being connected in parallel to output terminal 2. The anodes of uncontrolled rectifiers T4, T5 and T6 are connected in parallel to output terminal 4 and the cathodes thereof are connected to lines L1, L2 and L3, respectively.

The system is also provided with a controller C connected to lines L1, L2 and L3 for controlling conduction of controlled rectifiers T1, T2 and T3. To this end, the junctions of lines L1, L2 and L3 with controller C are connected through the primary windings of transformers 8, 10 and 12, respectively, to a common point 14. Controller C is also connected through conductor 16 to the cathodes of controlled rectifiers T1, T2 and T3 in parallel. Controller C is further connected through conductor 18 and then through a first branch including the secondary winding of transformer 10 and a resistor 20 in series to the control electrode of controlled rectifier T1, through a second branch including the secondary winding of transformer 12 and a resistor 22 in series to the control electrode of controlled rectifier T2, and through a third branch including the secondary winding of transformer 8 and a resistor 24 to the control electrode of controlled rectifier T3. Controller C provides a selectively controllable control electrode voltage and in conjunction with transformers 8, 10 and 12 a control electrode to cathode voltage superimposed thereon and phase-shifted relative to the anode to cathode voltage for controlling conduction of the controlled rectifiers. For a further description of the apparatus represented by controller C, reference may be had to the aforementioned copending application.

An essential feature of the invention is the provision of a protective device shown as a rectifier RT connected directly across output terminals 2 and 4 of rectifier network 6 and poled to block conduction in the direction of the applied armature voltage.

The operation of the system will now be described. Let it be assumed that three-phase alternating current power is connected to lines L1, L2 and L3 and that suitable direct current power is connected to motor shunt field winding F. When controller C is operated to increase the control electrode voltage on controlled rectifiers T1, T2 and T3 to the firing value, the latter conduct sequentially in accordance with the phases of the alternating current source to start the motor. The circuits of controlled rectifiers T1, T2 and T3 may be traced from line L1 through controlled rectifier T1, output terminal 2, armature A, output terminal 4 and uncontrolled rectifier T6 to line L3; and from line L2 through controlled rectifier T2, output terminal 2, armature A, output terminal 4 and uncontrolled rectifier T4 to line L1; and from line L3 through controlled rectifier T3, output terminal 2, armature A, output terminal 4 and uncontrolled rectifier T5 to line L2. Rectifier RT is poled to block conduction in response to the voltage applied from output terminals 2 and 4 across armature A. When rectifier network 6 functions normally, the controlled and uncontrolled rectifiers fire in a definite sequence such as the sequence hereinbefore described for exemplary purposes and shown by the shaded portion in FIG. 5. However, due to differences in the characteristics of the rectifiers, either original differences or variations therein requiring more than normal control electrode voltage to initiate conduction or total failure to conduct, a fault may occur in the sequential order of conduction. When the network is employed to supply an inductive load such as the armature winding shown, the armature current which started to flow through rectifiers T1 and T6 might continue to flow through rectifiers T1 and T4, due to the inductance of the armature winding, after the voltage across rectifiers T1 and T6 alternates to a negative value. Similarly, the armature current which started to flow through rectifiers T2 and T4 might continue to flow through rectifiers T2 and T5, and the armature current which started to flow through rectifiers T3 and T5 in its proper sequence might continue to flow through rectifiers T3 and T6 after the respective voltages alternate to negative values.

Figure 5:
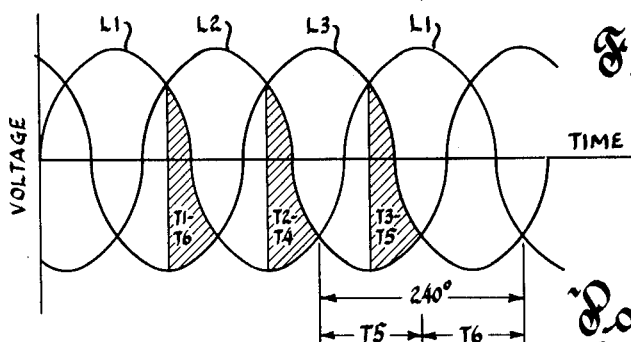
FIG. 5 graphically depicts operating characteristics of the system.

More specifically, if controlled rectifier T2, for example, does not fire in its proper sequence, then both rectifiers T1 and T3 must fire earlier to supply the same output current. Should the conduction period of rectifier T1 be extended by current flow through rectifiers T4 and T1 so that it continues to conduct after line L2 alternates to a negative value relative to line L1, there will result an uncontrolled conduction cycle of 240 degrees through rectifier T1 and first through rectifier T5 to line L2 and then through rectifier T6 to line L3 as shown in FIG. 5. This uncontrolled surge of current might damage rectifier T1. In addition, such faulty surge of current might rapidly accelerate the motor above the desired speed.

To prevent such faulty condition from occurring, protective rectifier RT is provided for shunting the armature current caused to flow in response to the self-induced armature voltage. Thus, such armature current flows from the upper end of armature A through rectifier RT to the lower end of armature A rather than through rectifiers T4—T1, T5—T2 or T6—T3.

In the modification shown in FIG. 2, reference characters identical to those of FIG. 1 have been employed to indicate like elements. The modification of FIG. 2 is similar to FIG. 1 except that controlled rectifiers T4', T5' and T6' have been employed in place of the uncontrolled rectifiers of FIG. 1 and modified protective networks have been associated with the respective controlled rectifiers to prevent faulty conduction thereof.

To this end, a voltage divider comprising series-connected resistors R1 and R2 is connected across controlled rectifier T4', the junction of resistors R1 and R2 being connected through a resistor R3 to the control electrode of controlled rectifier T4'. A capacitor C1 is connected in parallel with resistor R2 from the junction of resistors R1 and R2 to the cathode of controlled rectifier T4'. A resistor R4 is provided in the circuit extending from the junction of line L1 with the cathode of controlled rectifier T4' to network X and within the latter to the anode of rectifier T1 as shown in FIG. 1. In addition, a blocking rectifier RT1 is connected between the junction of resistor R4 with network X and the junction of resistors R1 and R2 to prevent discharge of capacitor C1 through resistor R4. Like protective networks are associated with controlled rectifiers T5' and T6', respectively.

Let it be assumed that power is connected to lines L1, L2 and L3 and that conduction is established in its proper sequence in a circuit extending from line L1 through resistor R4, controlled rectifier T1 in network X, armature A, output terminal 4, and controlled rectifier T6', to line L3. Current flow in this circuit causes a voltage drop across resistor R4. Capacitor C1 immediately charges in the direction shown to apply a voltage to the control electrode of controlled rectifier T4'. As will be apparent, such voltage will be negative relative to the voltage of line L1 connected directly to the cathode to bias controlled rectifier T4' to cutoff. The negative bias voltage thus applied to the control electrode is proportional to the voltage drop across resistor R4, discounting the negligible drop across blocking rectifier RT1. Capacitor C1 then begins to discharge through resistor R2. Rectifier RT1 is poled to prevent discharge of capacitor C1 through resistor R4. In this manner, each time controlled rectifier T1 fires, controlled rectifier T4' is positively prevented from conducting and the voltage induced in the armature winding is quickly dissipated against the power supply lines.

Assuming the aforementioned firing sequence, controlled rectifier T2 fires in its proper sequence following the conduction cycle of controlled rectifier T1. As will be apparent, a voltage is applied from the mid-point of the voltage divider comprising resistors R1 and R2 through resistor R3 to the control electrode of controlled rectifier T4'. This voltage will be positive relative to the cathode by an amount proportional to the voltage drop across resistor R2. Thus, each time controlled rectifier T2 fires, controlled rectifier T4' will be caused to conduct. Resistor R3 limits the control electrode current during the conduction cycle of controlled rectifiers T2 and T4'.

Controlled rectifiers T5' and T6' having protective networks identical to that hereinbefore described in connection with controlled rectifier T4', are controlled in a similar manner to conduct in their proper sequence. Also, controlled rectifiers T5' and T6' are biased to cutoff during the operating cycles of controlled rectifiers T2 and T3, respectively.

In the modification shown in FIG. 3, reference characters identical to those of FIG. 2 have been employed to indicate like elements. The modification of FIG. 3 is similar to FIG. 2 except that control electrode voltages are applied in a novel manner to insure firing of controlled rectifier pairs T1 and T6', T2 and T4' and T3 and T5' in their proper sequence.

To this end, a transformer PT1 having its primary winding connected across resistor R4 and its secondary winding connected in series with resistor R32 is provided for controlling controlled rectifier T6' in conjunction with controlled rectifier T1. A transformer PT2 having its primary winding connected across resistor R41 and its secondary winding connected in series with resistor R3 is provided for controlling rectifier T4' in conjunction with rectifier T2. A transformer PT3 having its primary winding connected across resistor R42 and its secondary winding connected in series with resistor R31 is provided for controlling rectifier T5' in conjunction with rectifier T3.

Let it be assumed that power is connected to lines L1, L2 and L3 and that conduction is established in its proper sequence in a circuit extending from line L1 through resistor R4, controlled rectifier T1 in network X, armature A, output terminal 4, and controlled rectifier T6' to line L3. As described in connection with FIG. 2, current flow in this circuit charges capacitor C1 to apply a negative voltage through the secondary winding of transformer PT2 and resistor R3 to bias controlled rectifier T4' to cutoff during the conducting cycle of controlled rectifier T1. In this manner, each time controlled rectifier T1 fires, controlled rectifier T4' is positively prevented from conducting.

In the aforementioned firing sequence, controlled rectifier T2 fires in its proper sequence following the conduction cycle of controlled rectifier T1. As a result, a voltage proportional to the voltage drop across resistor R41 is applied through transformer PT2 and resistor R3 to the control electrode of controlled rectifier T4' to render the latter conducting during the operating cycle of controlled rectifier T2. During this operating cycle, controlled rectifier T5' is prevented from conducting in the manner described in connection with controlled rectifier T4'.

Similarly, when controlled rectifier T3 fires in its proper sequence, controlled rectifier T6' is prevented from conducting and controlled rectifier T5' is caused to conduct by a voltage applied through transformer PT3 and resistor R31 to its associated control electrode. Also, when controlled rectifier T1 fires again, controlled rectifier T4' is prevented from conducting as hereinbefore described and controlled rectifier T6' is caused to conduct by a voltage applied through transformer PT1 and resistor R32 to its associated control electrode.

In the modification shown in FIG. 4, reference characters identical to those of FIGS. 2 and 3 have been employed for like elements. The modification of FIG. 4 is similar to FIG. 3 except that control electrode voltages are applied in a novel manner to prevent controlled rectifiers T4', T5', and T6' from conducting during the operating cycles of controlled rectifiers T1, T2 and T3, respectively.

To this end, the primary windings of transformers PT1, PT2 and PT3 are connected across resistors R4, F41 and R42, respectively, as in FIG. 3. However, the secondary winding fo transformer PT1 is connected at one end to the cathode of controlled rectifier T4' and at the other end through resistor R3 to the control electrode thereof. Similarly, the secondary windings of transformers PT2 and PT3 are connected at one end of the cathodes of controlled rectifiers T5' and T6' and at the other end through resistors R31 and R32, respectively, to the control electrodes of the associated controlled rectifiers. The secondary windings of transformers PT1, PT2 and PT3 have a larger number of turns than the primary windings thereof to provide control electrode voltages as hereinafter described.

Let it be assumed that power is connected to lines L1, L2 and L3 and that conduction is established in its proper sequence in a circuit extending from line L1 through resistor R4, controlled rectifier T1 in network X, armature A, output terminal 4 and rectifier T6' to line L3. The control electrode of rectifier T6' being connected through resistor R32 and the secondary winding of transformer PT3 to its cathode, rectifier T6' fires in this circuit as a diode. The voltage drop across resistor R4 is applied through transformer PT1 and resistor R3 to the control electrode of rectifier T4' to bias the same to cutoff during the operating cycle of rectifier T1.

In the modifications shown in FIGS. 3 and 4, rectifier T4' is prevented from conducting with rectifier T1, rectifier T5' is prevented from conducting with rectifier T2, and rectifier T6' is prevented from conducting with rectifier T3 and the voltage induced in the armature winding is dissipated against the power supply lines. Therefore, referring to FIG. 5, rectifiers T1, T2 and T3 are restricted to conduction in their proper sequence as shown by the shaded portions, are extinguished when the polarities of the respective pairs of lines L1—L3, L2—L1 and L3—L2 reverse and control of the system is maintained at all times.

I claim:

1. In an electrical system for supplying energy from a three-phase alternating current power supply source to an armature winding of a direct current shunt wound motor, in combination, a three-phase full-wave rectifier network for transferring energy from said source to said armature winding, said network comprising three controllable rectifier devices connected between the respective phases of said source and one side of said armature winding and three uncontrollable rectifier devices connected between the other side of said armature winding and the respective phases of said source thereby providing a plural-path rectifying network connecting said source to said armature winding and said network having a controllable and an uncontrollable rectifier device in each of said paths, means for controlling said controllable rectifier devices to effect predetermined repetitively sequential controlled current conduction in said paths adjustably to energize said armature winding, the inductive effect of said armature winding tending to cause misconduction of said rectifier devices, and protective means comprising a rectifier connected across said armature winding, said rectifier being poled to conduct current in response to the induced voltage of said armature winding in shunt of said network between conduction periods of said paths whereby to cause the controllable rectifier devices in said paths to stop conducting at substantially their predetermined times and thereby to prevent misconduction of said controllable rectifier devices and to protect the latter from excessive currents.

2. In an electrical system for supplying energy from a plural-phase alternating current power supply source to an inductive load, in combination, a plural-phase full-wave rectifier network for transferring energy from said source to said load, said network comprising a plurality of controllable unidirectional conducting devices connected between the respective phases of said source and one side of said load and a corresponding plurality of uncontrollable unidirectional conducting devices connected between said load and the respective phases of said source thereby providing a plural-path full-wave rectifying network connecting said source to said load and said network having a controllable and an uncontrollable unidirectional conducting device in each of said paths, means for controlling said controllable devices to effect predetermined repetitively sequential controlled current conduction in said paths adjustably to energize said load, the inductive effect of said load tending to cause misconduction of said controllable devices by applying another voltage across a given controllable device through the uncontrollable device connected to the same phase of the source following the conduction period of said given controllable device, and protective means comprising a unidirectional conducting device connected across said load, the last mentioned unidirectional conducting device being poled to conduct current in response to the induced voltage of said inductive load in shunt of said network between conduction periods of said controllable devices whereby to cause the controllable devices in said paths to stop conducting at substantially their predetermined times and to maintain control of the electrical energy supplied to said load.

References Cited in the file of this patent

UNITED STATES PATENTS

| | | |
|---|---|---|
| 1,928,812 | Dawson | Oct. 3, 1933 |
| 2,250,102 | Klemperer | July 22, 1941 |
| 2,288,338 | Willis | June 30, 1942 |
| 2,288,339 | Willis | June 30, 1942 |
| 2,372,964 | Livingston | Apr. 3, 1945 |
| 2,546,014 | Puchlowski | Mar. 20, 1951 |
| 2,720,621 | Schrider et al. | Oct. 11, 1955 |
| 2,758,251 | Schrider et al. | Aug. 7, 1956 |
| 2,844,779 | Alexanderson | July 22, 1958 |
| 2,873,417 | Wilkins | Feb. 10, 1959 |

FOREIGN PATENTS

| | | |
|---|---|---|
| 659,865 | Germany | May 12, 1938 |